United States Patent
Kannan et al.

(10) Patent No.: US 9,098,418 B2
(45) Date of Patent: Aug. 4, 2015

(54) COORDINATED PREFETCHING BASED ON TRAINING IN HIERARCHICALLY CACHED PROCESSORS

(75) Inventors: Hari S. Kannan, Sunnyvale, CA (US); Brian P. Lilly, San Francisco, CA (US); Gerard R. Williams, III, Los Altos, CA (US); Mahnaz Sadoughi-Yarandi, Santa Clara, CA (US); Perumal R. Subramoniam, San Jose, CA (US); Pradeep Kanapathipillai, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 484 days.

(21) Appl. No.: 13/425,123

(22) Filed: Mar. 20, 2012

(65) Prior Publication Data

US 2013/0254485 A1    Sep. 26, 2013

(51) Int. Cl.
| | |
|---|---|
| G06F 13/00 | (2006.01) |
| G06F 12/08 | (2006.01) |
| G06F 9/30 | (2006.01) |
| G06F 9/45 | (2006.01) |

(52) U.S. Cl.
CPC .......... *G06F 12/0862* (2013.01); *G06F 8/4442* (2013.01); *G06F 9/30047* (2013.01); *G06F 12/0897* (2013.01); *G06F 2212/1016* (2013.01); *G06F 2212/6024* (2013.01); *G06F 2212/6026* (2013.01); *G06F 2212/6028* (2013.01)

(58) Field of Classification Search
USPC ........... 711/137, 122, 213; 712/233, 237, 240
See application file for complete search history.

(56) References Cited

U.S. PATENT DOCUMENTS

| | | | |
|---|---|---|---|
| 6,317,811 B1 | 11/2001 | Deshpande et al. | |
| 6,446,167 B1* | 9/2002 | Mayfield et al. | 711/122 |
| 7,836,259 B1 | 11/2010 | Filippo et al. | |
| 2002/0069326 A1 | 6/2002 | Richardson et al. | |
| 2003/0079089 A1 | 4/2003 | Barrick et al. | |
| 2007/0088915 A1* | 4/2007 | Archambault et al. | 711/137 |
| 2007/0288697 A1* | 12/2007 | Keltcher | 711/137 |
| 2009/0199190 A1* | 8/2009 | Chen et al. | 718/102 |
| 2009/0307691 A1 | 12/2009 | Moscibroda et al. | |
| 2010/0268892 A1 | 10/2010 | Luttrell | |
| 2011/0066811 A1* | 3/2011 | Sander et al. | 711/137 |

(Continued)

FOREIGN PATENT DOCUMENTS

| | | |
|---|---|---|
| TW | 486628 B | 5/2002 |
| TW | 200821925 A | 5/2008 |
| TW | 200901027 A | 1/2009 |

OTHER PUBLICATIONS

Notice of Preliminary Rejection in Korean Patent Application No. 10-2013-29235, mailed May 16, 2014, 6 pages.

(Continued)

*Primary Examiner* — Hong Kim
(74) *Attorney, Agent, or Firm* — Rory D. Rankin; Meyertons, Hood, Kivlin, Kowert & Goetzel, P.C.

(57) ABSTRACT

Processors and methods for coordinating prefetch units at multiple cache levels. A single, unified training mechanism is utilized for training on streams generated by a processor core. Prefetch requests are sent from the core to lower level caches, and a packet is sent with each prefetch request. The packet identifies the stream ID of the prefetch request and includes relevant training information for the particular stream ID. The lower level caches generate prefetch requests based on the received training information.

20 Claims, 9 Drawing Sheets

(56) References Cited

U.S. PATENT DOCUMENTS

2012/0159073 A1* 6/2012 Jaleel et al. ............... 711/122
2013/0238861 A1* 9/2013 Manne et al. ............. 711/137

OTHER PUBLICATIONS

Fei Gao, Hanyu Cui, Suleyman Sair "Two-level Data Prefetching" 25th International Conference on Computer Design, 2007, pp. 1-8.
Harold W. Cain, Priya Nagpurkar, "Runahead Execution vs. Conventional Data Prefetching in the IBM POWER6 Microprocessor" International symposium on performance analysis of systems and software, 2010, pp. 1-10.
European Extended Search Report in application No. 13159754.4-1953 mailed Jul. 26, 2013 pp. 1-7.
International Search Report and Written Opinion in Application No. PCT/US2013/030497, May 7, 2013, pp. 1-13.
Zhigang Hu, Margaret Martonosi, and Stefanos Kaxiras "TCP: Tag Correlating Prefetchers", Feb. 2003, Proceedings of the 9th International Symposium on High-Performance Computer Architecture (HPCA '03), pp. 1-10.
Notice of Last Preliminary Rejection in Korean Patent Application No. 10-2013-29235, mailed Oct. 30, 2014, 4 pages.
Office Action in Taiwan Patent Application No. 102109728, mailed Oct. 14, 2014, 15 pages.

* cited by examiner

*Prefetch Training Table*
90

| Stream ID 92 | Stride 94 | Temporal 96 | Page Size 98 | Stream Type 100 | Demand Address 102 | Prefetch Address 104 |
|---|---|---|---|---|---|---|
| 0x1 | 0x4 | 0 | 64 KB | Load | 0x00AB | 0x00AF |
| 0x2 | 0x1 | 0 | 16 KB | Store | 0xF24D | 0xF251 |
| ⋮ | ⋮ | ⋮ | ⋮ | ⋮ | ⋮ | ⋮ |

*FIG. 4*

COORDINATED PREFETCHING BASED ON TRAINING IN HIERARCHICALLY CACHED PROCESSORS

BACKGROUND

1. Field of the Invention

The present invention relates generally to cache performance, and in particular to methods and mechanisms for prefetching data in processors with multiple levels of caches.

2. Description of the Related Art

Memory latency is frequently a large factor in determining the performance (e.g., instructions executed per second) of a processor in a given system. Over time, the operating frequencies of processors have increased dramatically, while the latency for access to dynamic random access memory (DRAM) in the typical system has not decreased at the same rate. Accordingly, the number of processor clocks required to access the external memory has increased. Therefore, techniques for compensating for the relatively low speed of memory devices have been developed. One technique is caching data in one or more caches located close to the processor. Caches are relatively small, low latency memories incorporated into the processor or coupled nearby.

Processors typically use caches to combat the effects of memory latency on processor performance. One way to mitigate the increasing latency of memory accesses is to prefetch data into a cache. The term "prefetch" may generally refer to the fetching of data from memory before that data is actually needed for computation by instructions in the program. One way that the memory bandwidth may be effectively utilized is to predict the information that will be accessed soon and then prefetch that information from the memory system into the cache. If the prediction is correct, the information may be a cache hit at the time of the actual request and thus the effective memory latency for actual requests may be decreased. On the other hand, if the prediction is incorrect, the prefetched information may replace useful information in the cache, causing more cache misses to be experienced than if prefetching were not employed and thus increasing the effective memory latency.

Certain types of computer programs process a long sequence of data where each element in the sequence is accessed only once. This type of access pattern usually results in cache misses since the required data is not in the cache at the time it is needed. This type of access may be referred to as a "data stream" or "stream", which is prevalent in certain multimedia applications. Prefetching data based on a prediction of the stream may help prevent cache misses and improve processor efficiency.

The simplest type of prefetch prediction is a unit stride prediction. For example, a training mechanism may detect accesses to cache lines L and L+1. Therefore, the training mechanism may detect that the stride is 1, and so a prefetch unit may start prefetching cache lines L+2, L+3, etc. In other embodiments, other non-unit strides may be detected, and furthermore, strides may be to descending addresses instead of just ascending addresses.

Modern superscalar processors use very aggressive speculation techniques that involve reordering of memory accesses in order to achieve higher performance.

Reordering of memory accesses results in obfuscation of any discernable pattern in the memory stream the further the operation progresses from the front-end of the machine. In addition, lower-level caches have to contend with simultaneous request streams from multiple cores, which further increases the entropy of these access patterns. Some authors use the term lower-level cache to refer to caches closer to the core, while others use the term to refer to caches further from the core. As used herein, the term "lower-level caches" refers to caches further away from the core (e.g., L2 cache, L3 cache), while the term "upper-level cache" may refer to caches closer to the core (e.g., an L1 cache).

The closer the memory accesses get to memory, the more garbled the memory accesses become in relation to their original order. As a result, it becomes harder to detect a common stride between consecutive memory accesses at lower-level caches since memory accesses get reordered at each level of the machine. Prefetch units at the lower-level caches thus have to contend with garbled memory streams, and are often unable to identify a common pattern across the stream. This effectively reduces the effectiveness of prefetching at low levels of the cache hierarchy.

SUMMARY

Systems, processors, and methods for performing coordinated prefetching in hierarchically cached processors are contemplated. In one embodiment, one centralized prefetch training mechanism per core may be utilized to train on streams. The training information produced by the training mechanism may be utilized to generate prefetch requests at multiple levels of cache hierarchy. Two or more prefetch units at separate cache levels may be coordinated utilizing the information obtained by the shared training mechanism. In one embodiment, the training mechanism may be located within a prefetch unit in the core, and the prefetch unit be coupled to the L1 cache.

In one embodiment, the training mechanism may be configured to simultaneously train on a plurality of streams generated by the processor core. For a given stream, the training mechanism may monitor memory accesses of the stream and detect the stride of the stream. Then, the training mechanism may assign an identifier (ID) to the stream and indicate that the stream is live for prefetching. In some embodiments, a processor may include multiple cores, and each core may maintain a centralized training mechanism within its respective L1 prefetch unit. The lower level prefetch units may receive training information from each L1 prefetch unit.

In one embodiment, the processor may include at least L1 and L2 caches and L1 and L2 prefetch units. The L1 prefetch unit may send prefetch requests to the L2 cache, and the L1 prefetch unit may send a packet along with each prefetch request. The packet may include a stream identifier (ID) and attributes associated with the prefetch request and the corresponding stream. The attributes may include stride, page size, temporal/non-temporal status, load/store indicator, demand and prefetch addresses, and other information. The L2 prefetch unit may utilize the attributes from the packet to generate prefetch requests. The L2 prefetch unit may also utilize the attributes from the packet to determine how to process and store the retrieved prefetch data.

In one embodiment, the L1 prefetch unit may maintain a table with information on the trained streams. In addition, the L2 prefetch unit may also maintain a table with information on the trained streams. The table maintained by the L2 prefetch unit may be a mirrored version of the table utilized by the L1 prefetch unit. When the L2 prefetch unit receives a prefetch request and accompanying packet from the core, the attributes from the packet may be stored in a corresponding entry in the table. Also, any additional lower level caches (e.g., L3) may maintain tables synchronized to the tables of the upper level caches.

In one embodiment, for a processor with one core and one L1 cache, the L2 prefetch table may be the same size as the L1 prefetch table in a one-to-one mapping. In another embodiment, for a processor with two cores and two L1 caches, the L2 table may be as large as a combination of the L1 tables, and all of the entries of the two separate L1 tables may be stored in the L2 table. In further embodiments, for additional numbers of cores, the L2 table may be sized to store all of the entries from all of the L1 tables.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 4 illustrates one embodiment of a prefetch training table.

DETAILED DESCRIPTION OF EMBODIMENTS

Figure 1:
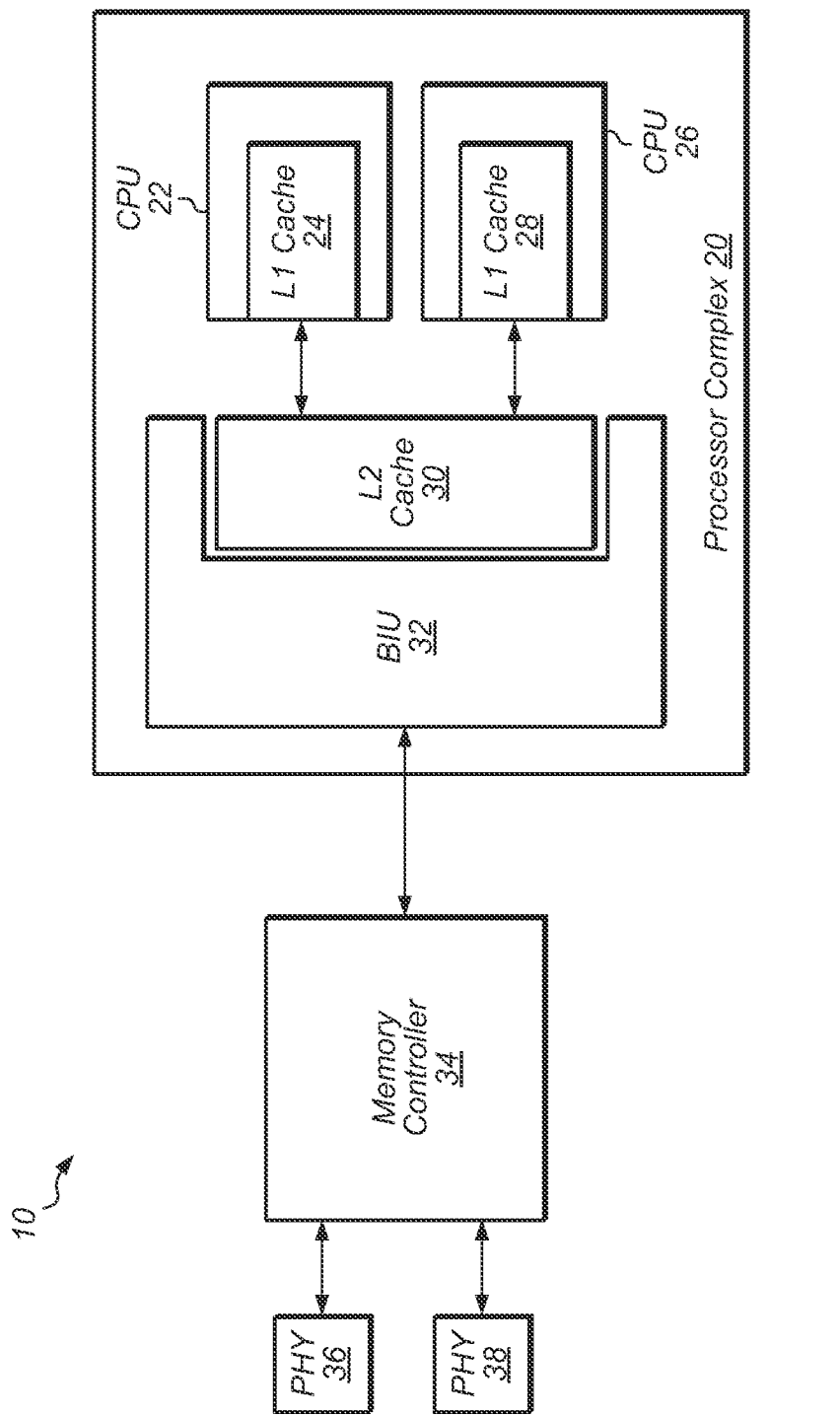
FIG. 1 is a block diagram that illustrates one embodiment of a portion of an IC.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a prefetch unit . . . . " Such a claim does not foreclose the apparatus from including additional components (e.g., a cache, a memory controller, a bus interface unit).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an integrated circuit (IC) is shown. In the illustrated embodiment, IC 10 includes a processor complex 20, memory controller 34, and memory physical interface circuits (PHYs) 36 and 38. It is noted that IC 10 may also include many other components not shown in FIG. 1. In various embodiments, IC 10 may also be referred to as a system on chip (SoC), an application specific integrated circuit (ASIC), or an apparatus.

Processor complex 20 may include central processing units (CPUs) 22 and 26, level two (L2) cache 30, and bus interface unit (BIU) 32. In other embodiments, processor complex 20 may include other numbers of CPUs. CPUs 22 and 26 may also be referred to as processors or cores. CPUs 22 and 26 may include level one (L1) cache 24 and L1 cache 28, respectively. L1 caches 24 and 28 may be coupled to L2 cache 30, and L2 cache 30 may be coupled to BIU 32, which may be coupled to memory controller 34. Other embodiments may include additional levels of cache (e.g., level three (L3) cache). It is noted that processor complex 20 and CPUs 22 and 26 may include other components not shown in FIG. 1.

The CPUs 22 and 26 may include circuitry to execute instructions defined in an instruction set architecture. Specifically, one or more programs comprising the instructions may be executed by the CPUs 22 and 26. Any instruction set architecture may be implemented in various embodiments. For example, in one embodiment, the PowerPC™ instruction set architecture may be implemented. Other exemplary instruction set architectures may include the ARM™ instruction set, the MIPS™ instruction set, the SPARC™ instruction set, the x86 instruction set (also referred to as IA-32), the IA-64 instruction set, etc.

In one embodiment, L2 cache 30 may be configured to cache instructions and data for low latency access by CPUs 22 and 26. The L2 cache 30 may comprise any capacity and configuration (e.g. direct mapped, set associative). In one embodiment, L2 cache 30 may be configured as a set-associative, writeback cache that is fully inclusive of L1 caches 24 and 28 within CPUs 22 and 26, respectively. In various embodiments, L2 cache 30 may include a variety of structures configured to support cache functionality and performance. For example, L2 cache 30 may include a miss buffer configured to store requests that miss the L2, a fill buffer configured to temporarily store data, a writeback buffer configured to temporarily store dirty evicted data and snoop copyback data, and/or a snoop buffer configured to store snoop requests. In some embodiments, L2 cache 30 may include a crossbar (not shown) for managing data flow between L2 cache 30 and BIU 32 and between L2 cache 30 and CPUs 22 and 26. In various embodiments, L2 cache 30 may implement arbitration logic to prioritize cache access among various cache read and write requestors. Other variations of L2 cache 30 configurations are possible and contemplated. L2 cache 30 may be coupled to memory controller 34 via BIU 32. BIU 32 may also include various other logic structures to couple CPUs 22 and 26 and L2 cache 30 to various other devices and blocks.

Memory controller 34 may include any number of memory ports and may include circuitry configured to interface to memory. For example, the memory controller 34 may be configured to interface to dynamic random access memory (DRAM) such as synchronous DRAM (SDRAM), double data rate (DDR) SDRAM, DDR2 SDRAM, Rambus DRAM (RDRAM), etc. Memory controller 34 may also be coupled to memory physical interface circuits (PHYs) 36 and 38. Memory PHYs 36 and 38 are representative of any number of memory PHYs which may be coupled to memory controller 34. The memory PHYs 36 and 38 may be configured to interface to memory devices (not shown).

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
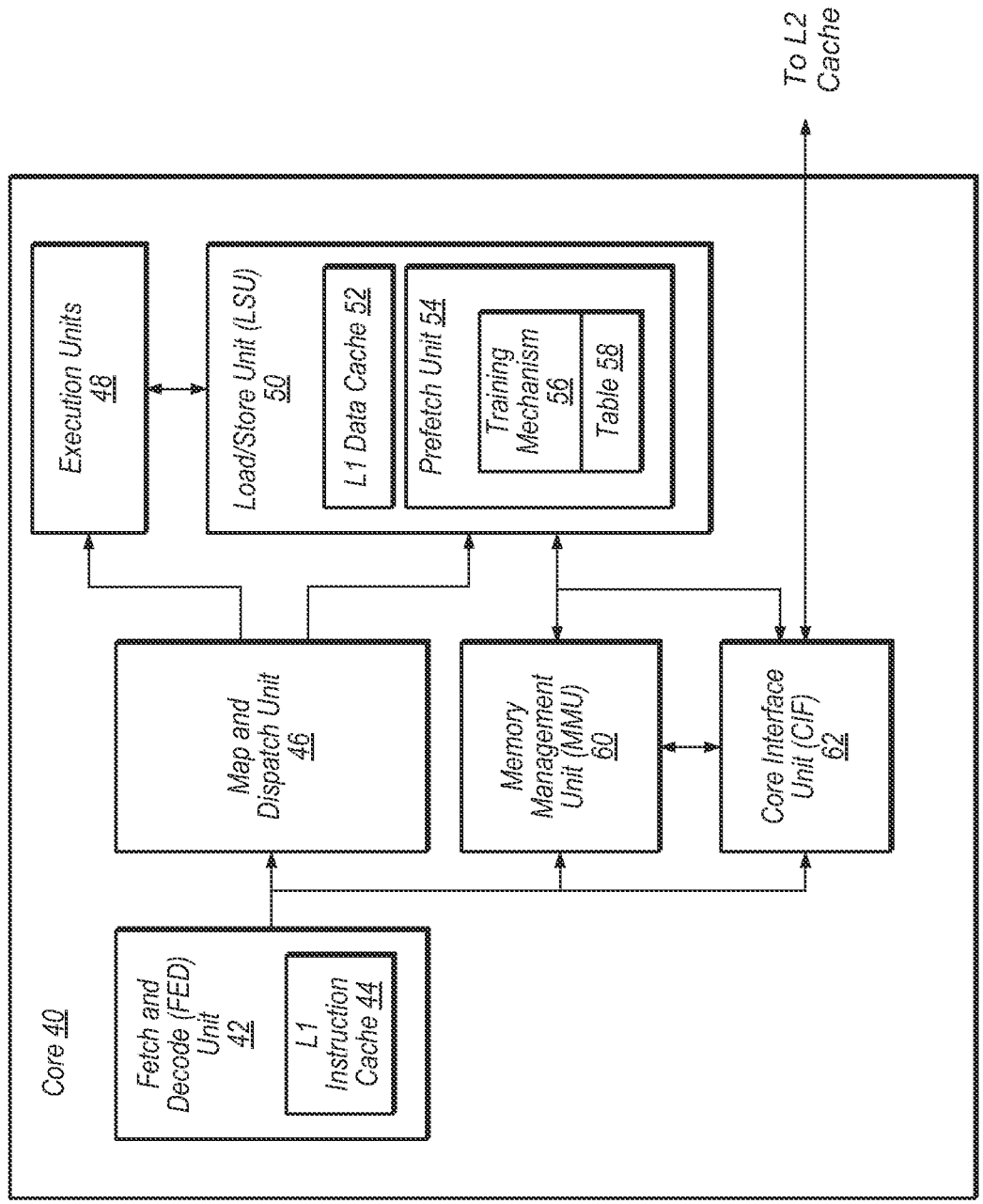
FIG. 2 is a block diagram that illustrates one embodiment of a processor core.

Turning now to FIG. 2, one embodiment of a processor core is shown. Core 40 is one example of a processor core, and core 40 may be utilized within a processor complex, such as processor complex 20 of FIG. 1. In one embodiment, each of CPUs 22 and 26 of FIG. 1 may include the components and functionality of core 40. Core 40 may include fetch and decode (FED) unit 42, map and dispatch unit 46, execution units 48, load/store unit (LSU) 50, memory management unit (MMU) 60, and core interface unit (CIF) 62. It is noted that core 40 may include other components not shown in FIG. 2.

FED unit 42, which includes the L1 instruction cache 44, may be configured to fetch instructions from memory (or the L2 cache) and decode the fetched instructions. Decoded instructions may be conveyed to the map and dispatch unit 46. Map and dispatch unit 46 may be configured to map decoded instructions to physical registers. Map and dispatch unit 46 may also be configured to dispatch instructions to execution units 48 and LSU 50. Execution units 48 may include any number and type of execution units (e.g., integer, floating point, vector).

CIF 62 may be coupled to L1 data cache 52, FED unit 42, and MMU 60. CIF 62 may be configured to manage the interface between core 40 and the L2 cache. MMU 60 may be configured to perform address translation and memory management functions. LSU 50 may include L1 data cache 52 coupled to prefetch unit 54. Prefetch unit 54 may include prefetch training mechanism 56 and prefetch training table 58. LSU 50 may also be coupled to an L2 cache (not shown) via CIF 62. It is noted that LSU 50 may also include other components (e.g., load queue, store queue) not shown in FIG. 2.

Prefetch unit 54 may be configured to generate prefetch requests in order to prefetch data into the L1 data cache 52. In one embodiment, prefetch unit 54 may be configured to concurrently maintain multiple separate, independent prefetch streams. A "prefetch stream" may refer to a stream of addresses and blocks associated with those addresses that are prefetched into the cache as a result of a detected prefetch pattern. The prefetch pattern may describe the difference between consecutive memory accesses in the prefetch stream. This difference between consecutive memory accesses may be referred to as the "stride" of the prefetch stream.

Training mechanism 56 may monitor the load/store traffic through L1 data cache 52 and/or at other points in the core 40. Training mechanism 56 may detect patterns of access in the load/store traffic and identify streams for prefetching. For each separate stream, training mechanism 56 may detect unit stride patterns for prefetches, such as prefetches of consecutive blocks in memory, either in an increasing-address or decreasing-address direction. Other embodiments may detect more complex prefetch patterns, including larger strides and repeating patterns that are not a single fixed distance between memory accesses.

In one embodiment, instructions being executed by core 40 may proceed in order until the instructions get to the execution units 48, at which point the instructions may be reordered. At this point, garbling may occur making it difficult to train on an instruction stream. Training mechanism 56 may train on instructions in core 40 prior to the instructions being reordered. Then, the training information may be propagated to the lower levels of the cache hierarchy.

Prefetch training mechanism 56 may train on streams generated by core 40.

Training may include detecting and analyzing the memory accesses associated with the various streams to determine information associated with the memory accesses. When prefetch training mechanism 56 has trained on a stream, it may assign a stream identifier (ID) to the stream and store an entry in table 58 with the stream ID. The entry may include attributes associated with the stream, such as temporality or non-temporality of data, stride, page size, memory access type, demand address, prefetch address, as well as other information.

Prefetch unit 54 may include a table 58 having a plurality of entries for storing training information on a plurality of streams. A given prefetch stream may be assigned to one of the entries of table 58, and generation of prefetches may be performed for that prefetch stream based on the contents of the entry. For example, the addresses of the prefetch request may be compared to the current address and/or the next expected address in the table entry. In one embodiment, prefetch unit 54 may maintain a least recently used (LRU) status across the entries in table 58 for replacement purposes.

A stream may be associated with a unique stream identifier (ID), and each entry of table 58 may include a stream ID along with attributes associated with a given stream. The stream ID and attributes may be propagated from the core down to the L2 and lower level caches. When core 40 sends out a prefetch request to the L2 cache, it may send data including the stream ID and other attributes with (or in association with) the request. The conveyed ID and attributes may take the form of a tuple, or otherwise, and may be included in an associated packet(s). As used herein, the term "packet" is used for ease of discussion and is not intended to be limited to a particular size or configuration of data. Rather, the methods and mechanisms described herein may convey the "packet" related data in many of a variety of ways. Conveying training data and other attributes may take any form or format.

In one embodiment, the tuple may contain the prefetch address, the stream ID, stride (e.g., 2 lines), and other attributes. When the L2 cache and L2 prefetch unit (not shown) receives the tuple, the L2 prefetch unit may store the attributes of the tuple in the corresponding entry in a L2 prefetch table (not shown). Then, the L2 prefetch unit may compare the new tuple to the last request the core sent to make sure that it stays ahead of the addresses being fetched by the L1 prefetch unit. If the stream ID in the tuple is a new stream ID, then the L2 prefetch unit may create a new entry for the specific stream ID.

For lower levels of the cache hierarchy, the prefetching may extend forward to prefetch further into the predicted memory locations of the stream. In one embodiment, there may be a start distance associated with each of the streams. The L1 prefetch unit may add a first start distance to the first prefetch request, and the L2 prefetch unit may add a second start distance on top of the first start distance. Lower level prefetch units (e.g., L3 prefetch unit) may add additional distances onto the prefetch request. In one embodiment, the start distance may be programmed locally at each prefetch unit. In another embodiment, the start distance may be sent as one of the attributes within the tuple.

In one embodiment, the L2 prefetch unit may not do any training itself. The L2 prefetch unit may get setup by the L1 prefetch unit, and then the L2 prefetch unit may generate more prefetch requests further along in the stream than the L1 prefetch unit. Generally speaking, the L2 prefetch unit may be an extension of the L1 prefetch unit. This approach may be extended to a third level, fourth level, and so on, where regardless of the number of hierarchical levels of caches, only a single unified training mechanism may be utilized. In such an embodiment, the L3 prefetch unit would be a slave to the upper two prefetch units.

Figure 3:
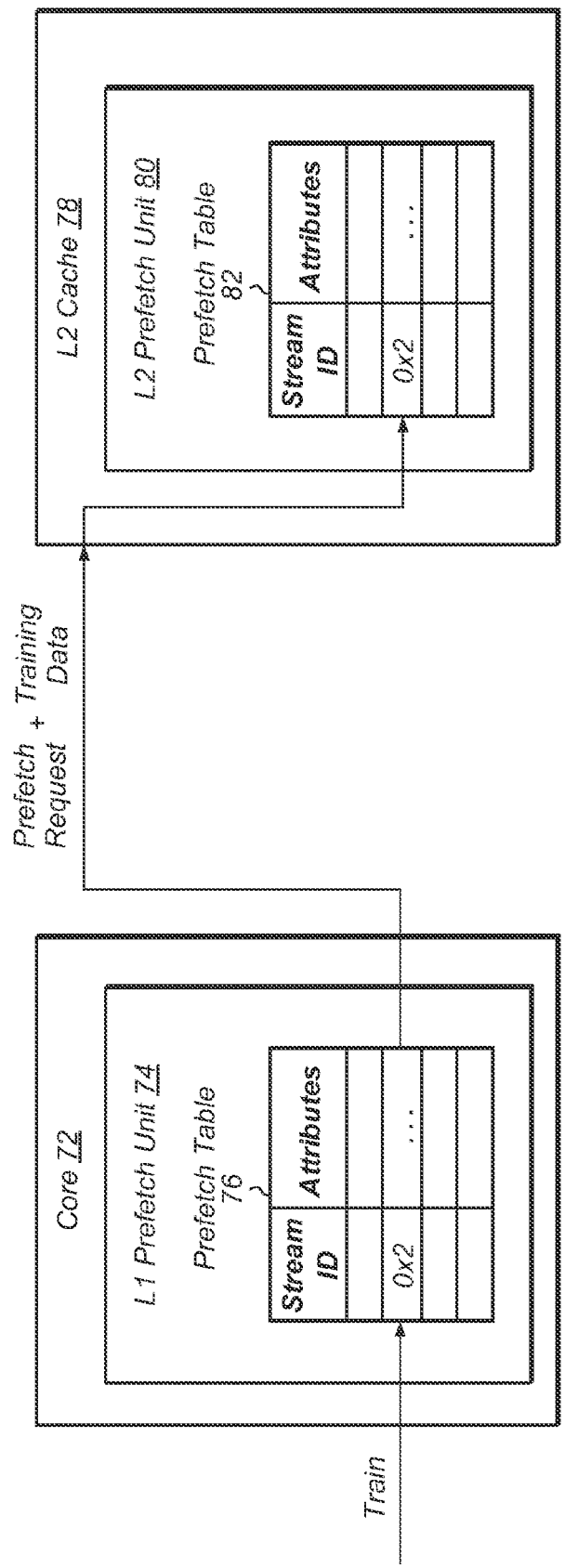
FIG. 3 is a block diagram of one embodiment of L1 and L2 prefetch units.

Referring now to FIG. 3, a block diagram of one embodiment of L1 and L2 prefetch units is shown. Core 72 is shown coupled to L2 cache 78, and core 72 may include a L1 prefetch unit 74. It is noted that core 72 may also include many other components that are not shown in FIG. 3 for purposes of clarity. L1 prefetch unit 74 may include a prefetch table 76 for storing data associated with streams that have been trained. L2 cache 78 may include L2 prefetch unit 80, which may include prefetch training table 82. Although not shown in FIG. 3, the prefetch requests and accompanying training data may pass through one or more components (e.g., MMU, CIF) between L1 prefetch unit 74 and L2 cache 88.

In one embodiment, core 72 may issue a prefetch request to L2 cache 78. The prefetch request may include a memory address of a line to be accessed. In addition, training data may be sent along with the prefetch request. The training data may identify the stream ID of the prefetch request, and may include other attributes (stored in table 76) associated with that particular stream ID.

In response to receiving the prefetch request and training data, L2 prefetch unit 80 may compare the training data to the entry in the table corresponding to the specific stream ID. For the example shown in FIG. 3, the stream ID may be '2', and L2 prefetch unit 80 may use this stream ID to locate the corresponding entry in table 82. L2 prefetch unit 80 may retrieve one or more attributes (e.g., stride) which may be used by L2 prefetch unit 80 to generate prefetch requests to memory (or to a lower level cache). In effect, the training data sent along with the prefetch requests may allow the entries of tables 78 and 82 to be synchronized.

It is to be understood that tables 76 and 82 may not contain exactly the same information, but tables 76 and 82 may generally be synchronized. For example, table 76 may be updated for a particular stream ID and there may be a time lag before table 82 is updated for that particular stream ID. Furthermore, one or more of the fields of the entries in table 76 and 82 may contain different information and/or may be formatted differently. For example, an address field corresponding to the last generated prefetch request may contain a different address in the entries of table 76 as compared to the entries of table 82. Nevertheless, generally speaking the data contained in table 82 may be reflective of the data in table 76 and may in this sense be synchronized to the data in table 76.

In one embodiment, each packet sent from core 72 to L2 cache 78 may include a bit which indicates if the stream is a new stream. If the stream is a new stream, as indicated by this bit, then the L2 prefetch unit 80 may find the corresponding entry in table 82 and clear this entry. Then, L2 prefetch unit 80 may fill the attributes of the cleared entry with the information contained in the packet. If the stream is an existing stream, then the packet may contain at least the stream ID, and L2 prefetch unit 80 may retrieve the corresponding entry corresponding to this stream ID in table 82. If the prefetch request hits in L2 cache 78, then the data may be returned to core 72, whereas if the prefetch request is a miss, then the L2 cache 78 may request the data from memory. Then, L2 prefetch unit 80 may generate new prefetch requests based on the attributes stored in the corresponding entry in table 82. The new prefetch requests issued by L2 prefetch unit 80 may allow it to stay ahead of core 72 for this particular stream so that future requests will result in hits in the L2 cache 78.

In another embodiment, L2 prefetch unit 80 may assume that each received packet and prefetch request is for a new stream. Therefore, in this embodiment, table 82 may be updated on any prefetch request that is received by L2 cache 78. For example, L2 prefetch unit 80 may overwrite the data in the corresponding entry in table 82 with the information in the received packet. In various embodiments, the L2 prefetch unit 80 may assume that any received prefetch request is for a new stream unless the request includes the same stream information as an existing stream.

In one embodiment, the packet may include information that controls the placement of data and the replacement policies in L2 cache 78. If a particular stream has a temporal or non-temporal attribute, L1 prefetch unit 74 may convey this information to L2 prefetch unit 80. In one embodiment, L2 prefetch unit 80 and the lower level caches may use this information to determine which way of the cache to store the corresponding data for this particular stream.

In one embodiment, L2 cache 78 may utilize the addresses and information from a prefetch request and packet sent from core 72 to make sure L2 prefetch unit 80 stays a predetermined number of lines ahead of the address contained in the prefetch request. If L2 prefetch unit 80 determines it has lagged behind, then L2 prefetch unit 80 may jump forward to stay ahead of L1 prefetch unit 74. L2 prefetch unit 80 may be configured to stay ahead of L1 prefetch unit 74 in the stream by a certain distance.

Turning now to FIG. 4, one embodiment of a prefetch training table is shown. Prefetch training table 90 may be utilized to store information associated with various trained streams. Table 90 is representative of a table which may be utilized by a prefetch unit at any level of the overall cache hierarchy. The number of entries in table 90 may vary depending on the embodiment, the level of the cache hierarchy at which table 90 is located, the maximum number of concurrent streams, as well as other information. In other embodiments, training table 90 may include other information, and/or some of the attributes shown in table 90 may not be included in the table. Alternatively, one or more of the attributes shown in table 90 may be stored in another location of the corresponding prefetch unit.

Each entry of table 90 may include a plurality of attributes. A stream ID 92 may be included in each entry and may be utilized to identify the entry. The stream ID 92 may correspond to a respective stream ID that has been trained by a training mechanism in the core. The stride 94 may be the detected stride for the stream, and in one embodiment may be a number of lines. The temporality indicator 96 may be a bit that indicates if the stream corresponds to temporal or non-temporal data. The L2 cache and lower level caches may utilize temporality indicator 96 to bias the way selection in its LRU mechanism. The value of temporality indicator 96 may also affect replacement policy within a cache.

Another attribute stored in the entries of table 90 may be the page size attribute 98 (e.g., 64 KB, 128 KB, 1 MB). In one embodiment, a L2 prefetch unit (and lower level prefetch units) may use this attribute to determine the page boundaries. When encountering a page boundary, the L2 prefetch unit may stop prefetching. The L2 prefetch unit may also use a prefetch count to determine when to stop prefetching, such that once the prefetch count has been reached, then the L2 prefetch unit may stop prefetching until it receives another prefetch request. The prefetch count may be programmed or set separately from the attributes received with the packets accompanying prefetch requests. In one embodiment, the prefetch count may not be stored in table 90, although in other embodiments, the prefetch count may be stored in table 90.

In various embodiments, a "turbo" mode may be utilized by the various prefetch units. At any cache level, if a given stream stays alive and advances with the same attributes, the prefetch count may be increased in order to stay further ahead of the given stream. The status of the given stream may be tracked by a separate counter, and this separate counter may count the number of prefetch requests arriving at each cache level from above. For example, the number of L1 prefetch requests that have been received at the L2 level for a particular stream may be counted at the L2 prefetch unit. If the number of L1 prefetch requests reaches a threshold, the L2 prefetch unit may enter a turbo mode, which will increase the prefetch count and increase the number of prefetch requests generated by the L2 prefetch unit in an attempt to stay further ahead of the stream. The threshold may be programmable and may vary from embodiment to embodiment. Similarly, the L1 prefetch unit may implement an analogous technique to apply turbo mode based on tracking the number of demand requests received at the L1 cache level for the various streams. The value of the separate counter may or may not be stored in table 90, depending on the embodiment. Various embodiments including combinations of the above are possible and are contemplated.

When a lower level cache prefetch unit reaches a page boundary, the prefetch unit may not be sure if the next page in the physical address space corresponds to the next page in the program's virtual address space. Therefore, in one embodiment, when a lower level prefetch unit, such as an L2 prefetch unit, reaches a page boundary, the L2 prefetch unit may stop at the page boundary. When the higher level prefetch unit, in this case the L1 prefetch unit, crosses the page boundary, it may send a new prefetch request with the address of the next page to the L2 prefetch unit.

Each entry of table 90 may also include a stream type attribute 100 to indicate if the stream is a load stream or a store stream. For example, if the stream is a load stream, then the L2 prefetch unit may retrieve lines of data in a shared state. If the stream is a store stream, then the L2 prefetch unit may bring the data into the core in an exclusive state so that the core can modify the data.

In one embodiment, a L1 prefetch unit may combine information between load and store streams into a single entry in L1 prefetch training table. For example, if a load stream and a store stream are both targeting the same region of memory, the L1 prefetch unit may collapse the load and store streams into one stream. Therefore, the L1 prefetch unit may create one stream entry in the L1 table instead of creating two different stream entries. For example, in one embodiment, if the load stream is generated first, the L1 prefetch unit will train on the load stream and fill a corresponding entry in the L1 table with the attributes of the load stream. Then, when a store request is detected, if the L1 prefetch unit determines that the store request is to the same address as a pending load request, then the store request may be collapsed into the load stream, and then the load stream may be converted into a store stream. Then, when a corresponding prefetch request gets sent out from the L1 to the L2, the accompanying packet may get sent out with a "store" attribute, which means that the L2 will be responsible for retrieving the data in an exclusive state, instead of in a shared state.

Each entry in table 90 may also include a demand address 102 attribute and a prefetch address 104 attribute. When the L1 cache receives a demand request, it may store the address of the demand request in the demand address 102 attribute of the corresponding stream entry. When an L2 (or lower level) prefetch unit receives a prefetch request from a higher level cache, the L2 prefetch unit may store the address of the prefetch request in the demand address 102 attribute. The L1 prefetch unit and lower level prefetch units may store the current address being prefetched in the prefetch address 104 attribute of the corresponding entry. When a L2 prefetch unit receives a prefetch request and packet, the L2 prefetch unit may compare the prefetch request address with the demand address 102 stored in table 90 for that particular stream ID. If the incoming prefetch request is ahead of the physical address stored in that entry, then the L2 prefetch unit may overwrite the demand address 102 attribute of the entry with the new address.

In one embodiment, when the L2 prefetch unit receives a prefetch request and packet, the L2 prefetch unit may check to see if the prefetch request corresponds to an existing entry in the L2 table, and if so, it may advance that prefetch request. Otherwise, the L2 prefetch unit may flush an old entry from the table, and then the L2 prefetch unit may populate the entry with the new data contained in the prefetch request and the accompanying packet.

Figure 5:
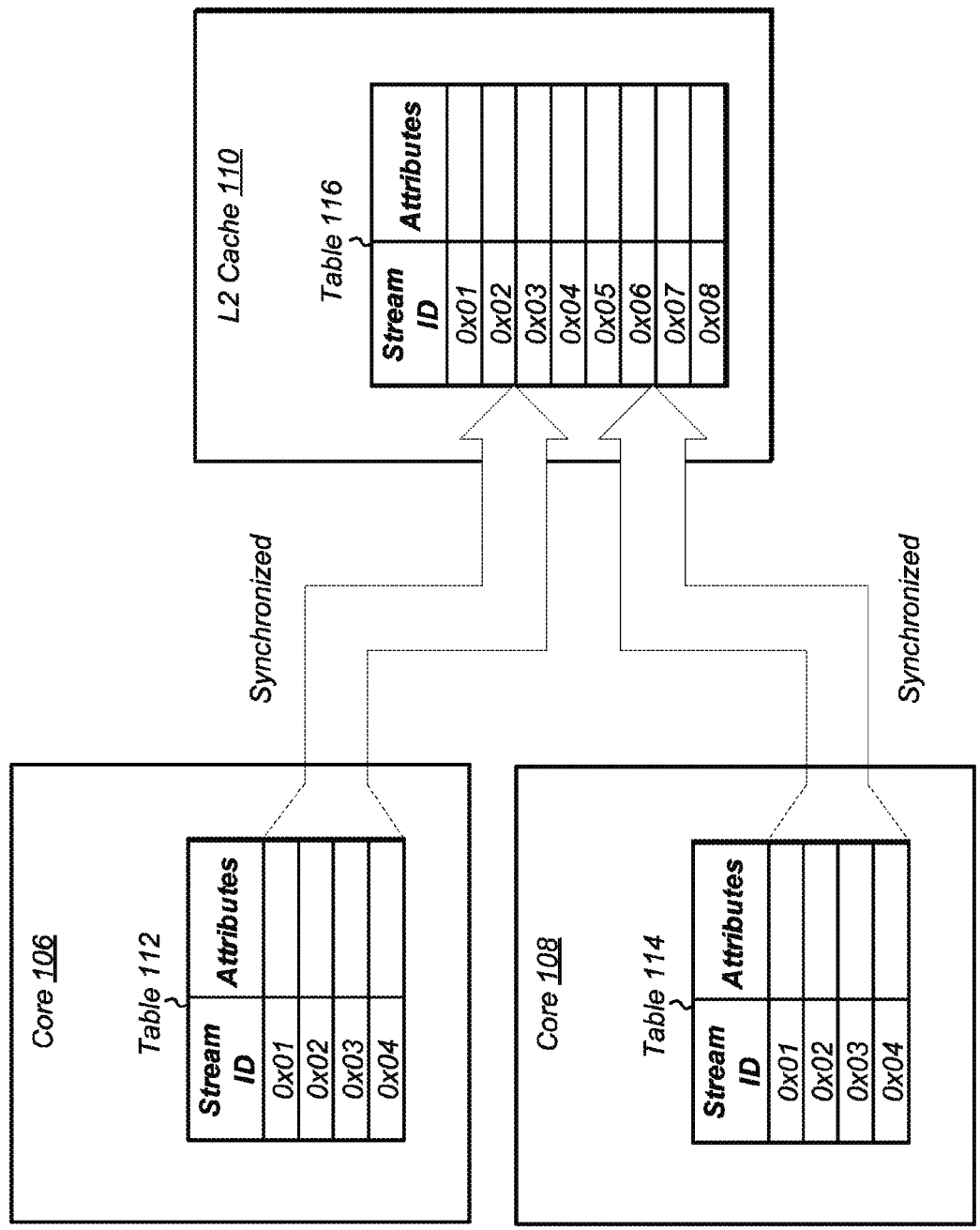
FIG. 5 is a block diagram of one embodiment of the mapping between prefetch tables of separate levels of cache.

Referring now to FIG. 5, a block diagram of one embodiment of the mapping between prefetch tables of separate levels of cache is shown. In one embodiment, an IC or SoC may include two cores, core 106 and core 108. In other embodiments, other numbers of cores (e.g., four, eight) may be included in the IC or SoC. Tables 112 and 114 are each shown as including four entries. In other embodiments, tables 112 and 114 may include other numbers of entries (e.g., eight, sixteen). Any number and type of attributes may be stored in tables 112, 114, and 116. For example, one or more of the attributes shown in table 90 (of FIG. 4) may be stored in tables 112, 114, and 116. Additionally, other attributes now shown in table 90 may be stored in tables 112, 114, and 116.

As shown, the first four entries of table 116 of L2 cache 112 may be synchronized with the entries of table 112 . The entries for the bottom four entries of table 116 of L2 cache 110 may be synchronized with the entries of table 114. The entries in table 114 may be assigned stream IDs 1-4, and these stream IDs may be mapped to stream IDs 5-8 in table 116. In one embodiment, entries in table 116 may be synchronized with entries in tables 112 and table 114 as prefetch requests and accompanying packets are sent from the cores to L2 cache 110.

Table 116 may include enough entries to store and mirror all of the entries of all of the L1 caches that are coupled to L2 cache 110. In the embodiment shown in FIG. 5, table 116 includes eight entries. In other embodiments, table 116 may include other numbers of entries. For example, in a processor with eight cores and with each core storing 16 entries for 16 separate stream IDs in a core prefetch training table, then table 116 may include 128 entries for storing all of the entries from all of the cores. Other numbers of cores coupled to an L2 cache are possible and are contemplated.

Figure 6:
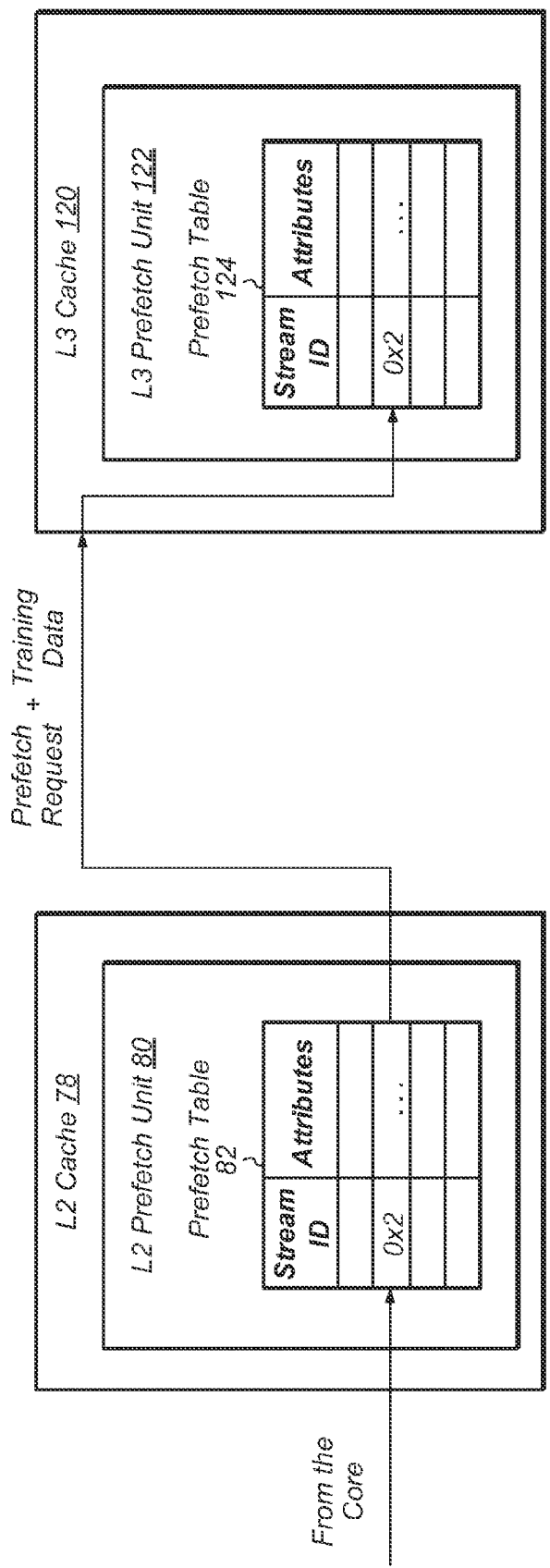
FIG. 6 is a block diagram of one embodiment of L2 and L3 prefetch units.

Turning now to FIG. 6, a block diagram of one embodiment of L2 and L3 prefetch units is shown. FIG. 6 illustrates a continuation of the block diagram illustrated in FIG. 3. L2 cache 78 may receive prefetch requests and training information from a core (e.g., core 72 of FIG. 3), and then L2 prefetch unit 80 may store training data in table 82. L2 prefetch unit 80 may generate prefetch requests based on the received prefetch requests, training data, and/or the data in table 82. L2 prefetch unit 80 may convey the prefetch requests to L3 cache 120, and L2 prefetch unit 80 may also generate and convey the training data along with the prefetch request. The training data may include attributes from table 82 for the particular stream ID associated with the prefetch request.

L3 prefetch unit 122 may receive the prefetch request and training data and store the training data in the corresponding entry of table 124. In general, L3 prefetch unit 122 may function in a similar manner to L2 prefetch unit 80 in response to receiving a prefetch request and accompanying training data. L3 prefetch unit 122 may utilize the training data and/or corresponding table 124 entry to stay ahead of the prefetch requests generated by L2 prefetch unit 80. In some embodiments, training information may be sent from the core to L2 cache 78 and to L3 cache 120 in parallel. In this way, L2 table 82 and L3 table 124 may be updated at the same time by the training information.

Other embodiments may include additional levels of caches, and any lower level caches may synchronize their prefetch tables with the tables of the upper level caches. Lower level caches and prefetch units may respond to prefetch requests and packets in a similar manner to the way upper level caches and prefetch units respond to receiving prefetch requests and packets. In addition, lower level prefetch tables may include enough entries to store all of the entries of the upper level prefetch tables. For example, if the L3 cache 120 is coupled to L2 cache 78 and to another L2 cache (not shown), L3 prefetch table 124 may include as many entries as the combination of both L2 prefetch tables.

Figure 7:
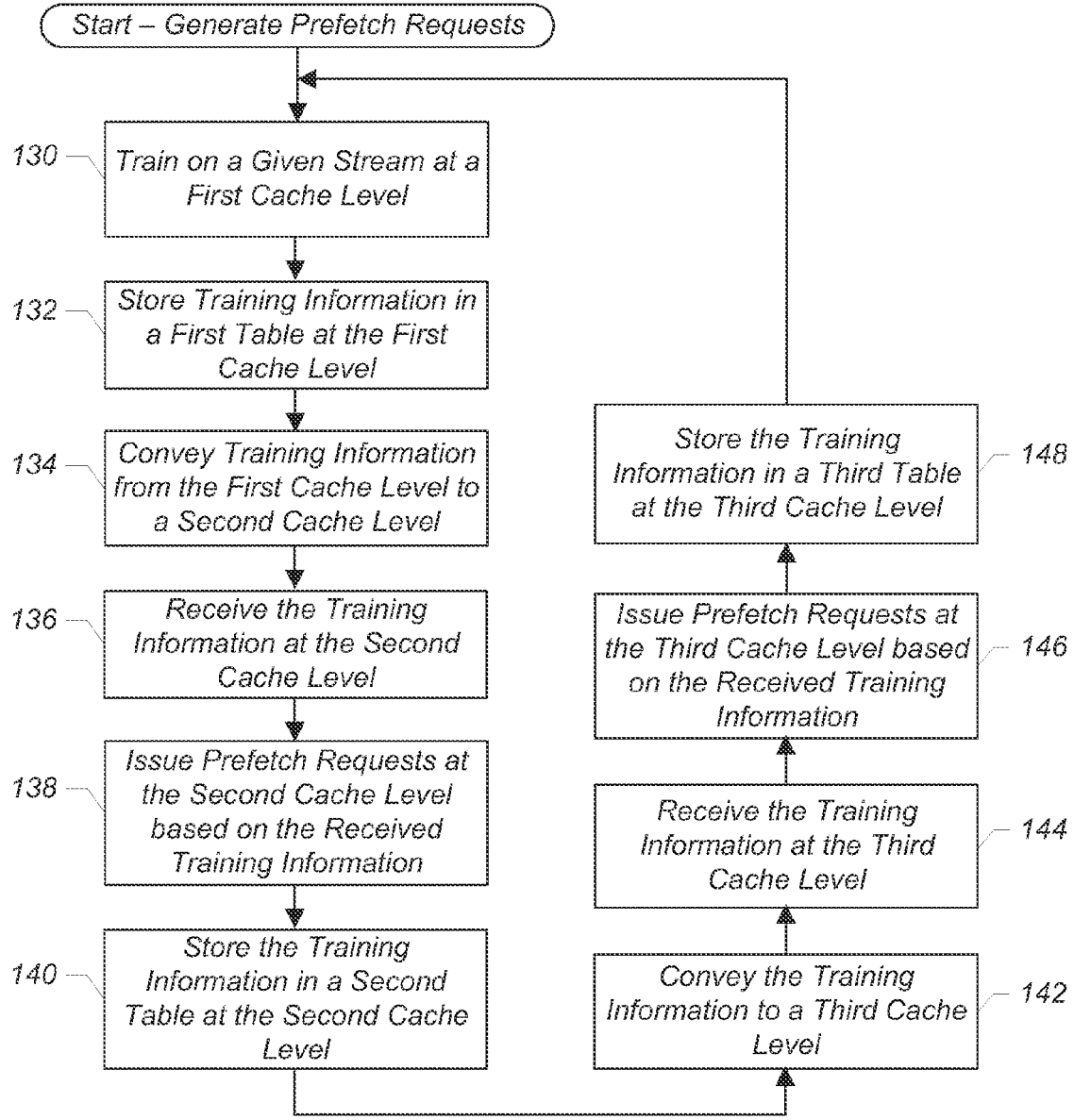
FIG. 7 is a generalized flow diagram illustrating one embodiment of a method for generating prefetch requests.

Referring now to FIG. 7, one embodiment of a method for generating prefetch requests at multiple cache levels is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a training mechanism coupled to a first cache level may train on a given stream (block 130). The training mechanism may be located within a prefetch unit within a processor core. A processor may include multiple cores, and each core may have a single training mechanism. The training information generated by the training mechanism may be stored in a corresponding entry of a first table at the first cache level (block 132). The entry in the first table may include a stream ID for the trained stream. In one embodiment, the first cache level may be a L1 cache, and the first table may be stored in a prefetch unit coupled to the L1 cache.

Next, training information may be conveyed from the first cache level to a second cache level (block 134). In one embodiment, a prefetch request may be generated by the prefetch unit at the first cache level and sent to the second cache level, and the training information may be included within a packet that accompanies the prefetch request. A prefetch unit at the second cache level may receive the training information (block 136), and then the prefetch unit may issue prefetch requests based on the received training information (block 138). The prefetch unit at the second cache level may issue prefetch requests that are a certain distance ahead of the prefetch requests being issued at the first cache level. After an initial lag, prefetch requests from the first cache level should begin to hit in the second cache level for the given stream. The prefetch unit at the second cache level may also store the received training information in a corresponding entry in a second table (block 140). It is noted that blocks 138 and 140 may occur simultaneously or block 140 may be performed prior to block 138, depending on the embodiment. In one embodiment, the second cache level may be a L2 cache.

After block 140, the prefetch unit at the second cache level may convey the training information to a third cache level (block 142). In one embodiment, the training information may be included within a packet that accompanies the prefetch request to the third cache level. A prefetch unit at the third cache level may receive the training information (block 144), and then the prefetch unit at the third cache level may issue prefetch requests based on the received training information (block 146). The received training information may be also stored in a corresponding entry in a third table (block 148). In one embodiment, the third cache level may be a L3 cache. After block 148, the method may return to block 130 to train on a new stream. It is noted that multiple streams may be trained in parallel, and multiple streams may be at various points within the block diagram of FIG. 7 at any given time. Other embodiments may include other numbers of caches. Generally speaking, the training mechanism at a highest level of cache may share prefetch training information with the lower level caches.

Figure 8:
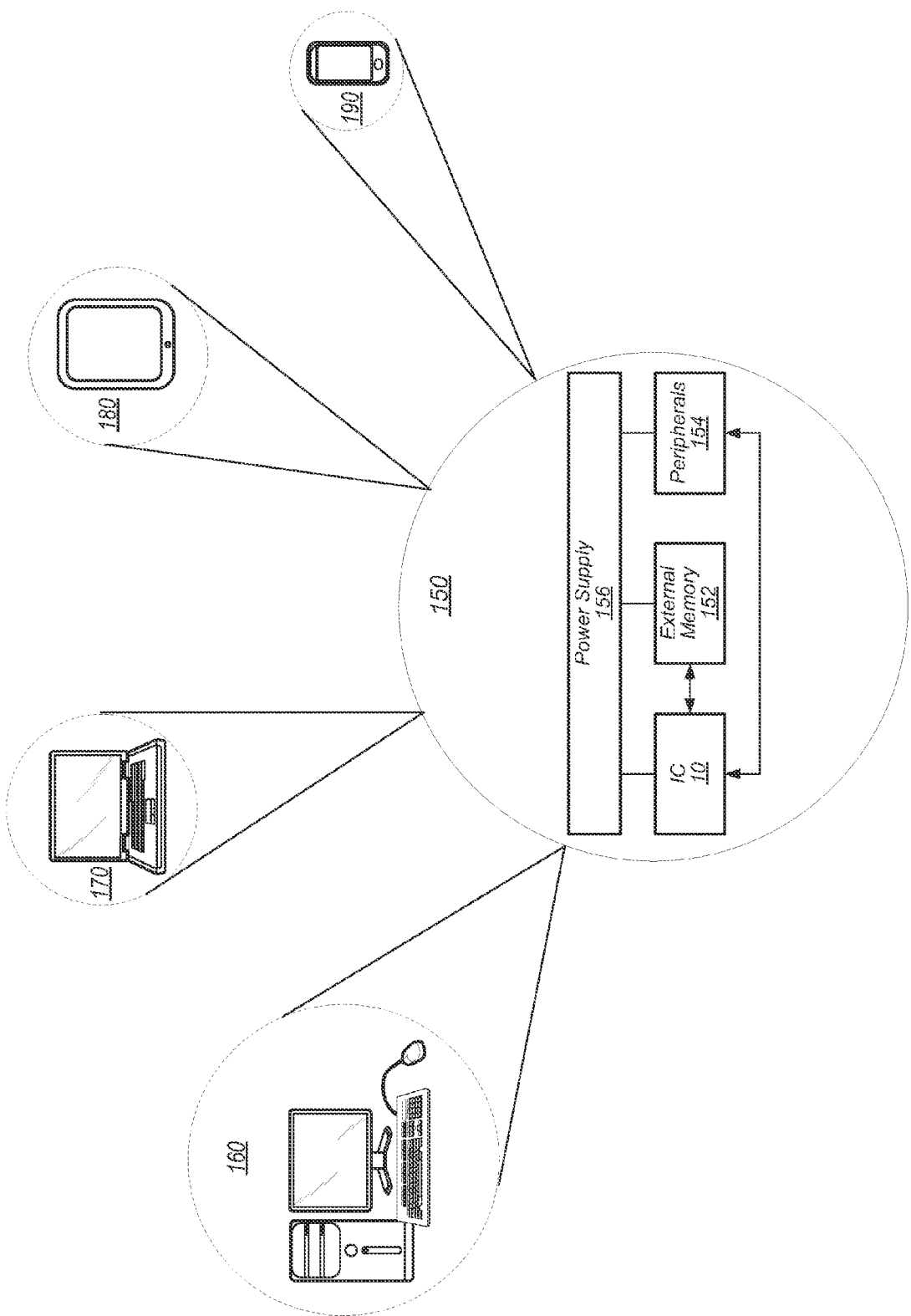
FIG. 8 is a block diagram of one embodiment of a system.

Turning now to FIG. 8, a block diagram of one embodiment of a system 150 is shown. As shown, system 150 may represent chip, circuitry, components, etc., of a desktop computer 160, laptop computer 170, tablet computer 180, cell phone 190, or otherwise. In the illustrated embodiment, the system 150 includes at least one instance of IC 10 (of FIG. 1) coupled to an external memory 152.

IC 10 is coupled to one or more peripherals 154 and the external memory 152. A power supply 156 is also provided which supplies the supply voltages to IC 10 as well as one or more supply voltages to the memory 152 and/or the peripherals 154. In various embodiments, power supply 156 may represent a battery (e.g., a rechargeable battery in a smart phone, laptop or tablet computer). In some embodiments, more than one instance of IC 10 may be included (and more than one external memory 152 may be included as well).

The memory 152 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 10 in a chip-on-chip configuration, a package-on-package configuration, or a multi-chip module configuration.

The peripherals 154 may include any desired circuitry, depending on the type of system 150. For example, in one embodiment, peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc.

Figure 9:
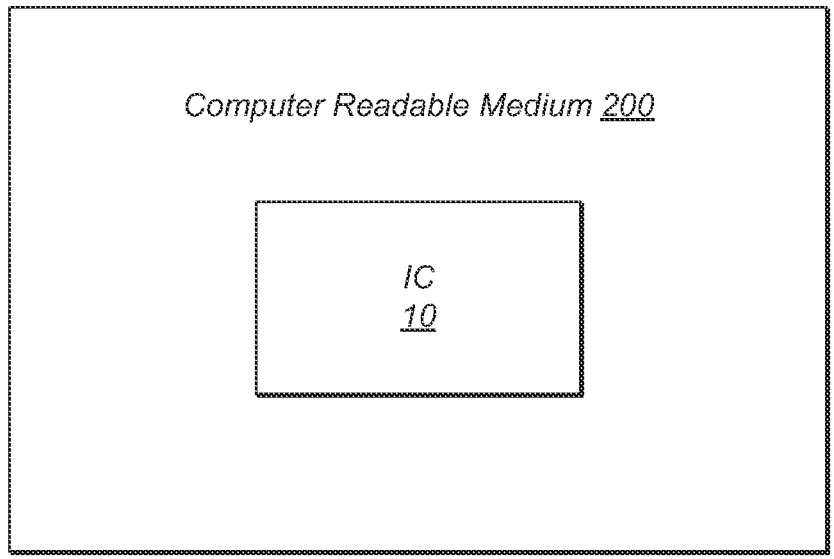
FIG. 9 is a block diagram of one embodiment of a computer readable medium.

Referring now to FIG. 9, one embodiment of a block diagram of a computer readable medium 200 including one or more data structures representative of the circuitry included in IC 10 (of FIG. 1) is shown. Generally speaking, computer readable medium 200 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 200 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 200 may be the netlist(s) (with or without the synthesis library) or the data set(s), as desired. In yet another alternative, the data structures may comprise the output of a schematic program, or netlist(s) or data set(s) derived therefrom. While computer readable medium 200 includes a representation of IC 10, other embodiments may include a representation of any portion or combination of portions of IC 10 (e.g., processor complex 20, CPU 22, L2 cache 30).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A processor comprising:
   a cache hierarchy comprising at least two caches arranged in two levels;
   a first prefetch unit associated with a first cache of the at least two caches, wherein the first prefetch unit is configured to maintain a first prefetch table comprising a plurality of entries, wherein each entry comprises a stream identifier (ID) and attributes associated with a corresponding stream;
   a second prefetch unit associated with a second cache of the at least two caches, the second prefetch unit being different from the first prefetch unit, wherein the second prefetch unit is configured to maintain a second prefetch table with an entry for each entry in the first prefetch table including a stream ID and attributes associated with a corresponding stream; and
   a prefetch training mechanism associated with the first cache;
   wherein the prefetch training mechanism is configured to generate training information for each of a plurality of streams, wherein the training information is utilized for determining whether the first prefetch unit is to issue prefetch requests for data corresponding to the plurality of streams into the first cache;
   wherein the prefetch unit is configured to convey said training information to the second prefetch unit; and
   wherein said second prefetch unit is configured to issue prefetch requests for data corresponding to a plurality of streams into the second cache based on attributes stored in the second prefetch table.

2. The processor as recited in claim 1, wherein said second prefetch unit does not perform any training for prefetches.

3. The processor as recited in claim 1, wherein said training information includes temporal data that is used by the second cache as part of a cache replacement policy.

4. The processor as recited in claim 3, wherein the first prefetch unit is configured to:
   generate a prefetch request for a given stream based on attributes stored in a corresponding entry in the first prefetch table; and
   convey the prefetch request and a packet to the second cache, wherein the packet comprises one or more attributes from the corresponding entry in the first prefetch table.

5. The processor as recited in claim 4, wherein the second prefetch unit is further configured to:
   detect a page boundary for a given stream; and
   stop prefetching responsive to detecting said page boundary.

6. The processor as recited in claim 1, wherein training information in the second prefetch table is synchronized with training information in the first prefetch table.

7. The processor as recited in claim 1, wherein the second prefetch unit is configured to:
  count a number of prefetch requests issued by the first prefetch unit; and
  increase a number of prefetch requests generated by the second prefetch unit in response to determining said number exceeds a threshold.

8. The processor as recited in claim 1, wherein the prefetch training mechanism is coupled to a highest level of cache of the plurality of levels of caches and generates training information for a plurality of streams, wherein the training information is utilized for generating prefetch requests at each of the plurality of levels of caches.

9. The processor as recited in claim 1, wherein said attributes in the first prefetch table comprise an indication of whether a corresponding stream is a load stream or a store stream.

10. The processor as recited in claim 8, wherein the prefetch unit is configured to:
  generate a plurality of prefetch requests based on the training information;
  generate a packet for each prefetch request, wherein the packet comprises attributes associated with the prefetch request and a corresponding stream; and
  convey the prefetch request and the packet to a lower level cache.

11. The processor as recited in claim 1, wherein said training information further comprises data used by the second cache to bias way selection in a cache replacement policy.

12. The processor as recited in claim 11, wherein the attributes further comprises a stride of the corresponding stream.

13. The processor as recited in claim 11, wherein the prefetch unit is further configured to assign a load stream and a store stream with a single stream identifier, responsive to detecting accesses by the load stream and the store stream to a same address.

14. A method comprising:
  generating training information on a plurality of streams, wherein the training is performed by a prefetch training mechanism coupled to a first cache at a first cache level, wherein said training information is utilized to determine whether prefetch requests are to be issued by a first prefetch unit corresponding to the plurality of streams into the first cache; and
  storing the training information in a first table at the first cache level, wherein the first table comprises a plurality of entries, each entry comprising a stream identifier (ID) and attributes associated with a corresponding stream;
  conveying said training information to a second cache level;
  storing the training information in a second table at the second cache level, wherein the second table comprises a plurality of entries, each entry comprising a stream identifier (ID) and attributes associated with a corresponding stream; and
  a second prefetch unit, different from the first prefetch unit, coupled to said second cache at said second cache level issuing prefetch requests for a plurality of streams into the second cache based on attributes stored in the second prefetch table.

15. The method as recited in claim 14, wherein said second prefetch unit does not perform any training for prefetches.

16. The method as recited in claim 15,
  wherein the second table is synchronized with the first table.

17. The method as recited in claim 14, further comprising:
  counting by the second prefetch unit a number of prefetch requests issued by the first prefetch unit; and
  increasing a number of prefetch requests generated by the second prefetch unit in response to determining said number exceeds a threshold.

18. The method as recited in claim 17, wherein said training information includes temporal data that is used by the second cache as part of a cache replacement policy.

19. The method as recited in claim 16, further comprising storing the training information in a third table at the third cache level, wherein the third table is synchronized with the second table.

20. The method as recited in claim 15, wherein the first cache level is a level one (L1) cache, wherein the second cache level is a level two (L2) cache.

* * * * *